J. S. R. BAXTER.
EXTENSION FRAME FOR BICYCLES.
APPLICATION FILED JULY 15, 1912.

1,070,319.

Patented Aug. 12, 1913.

2 SHEETS—SHEET 1.

Witnesses:
L. B. Weymouth.
E. C. Murphy.

Inventor:
James S. R. Baxter
by Henry J. Miller
atty.

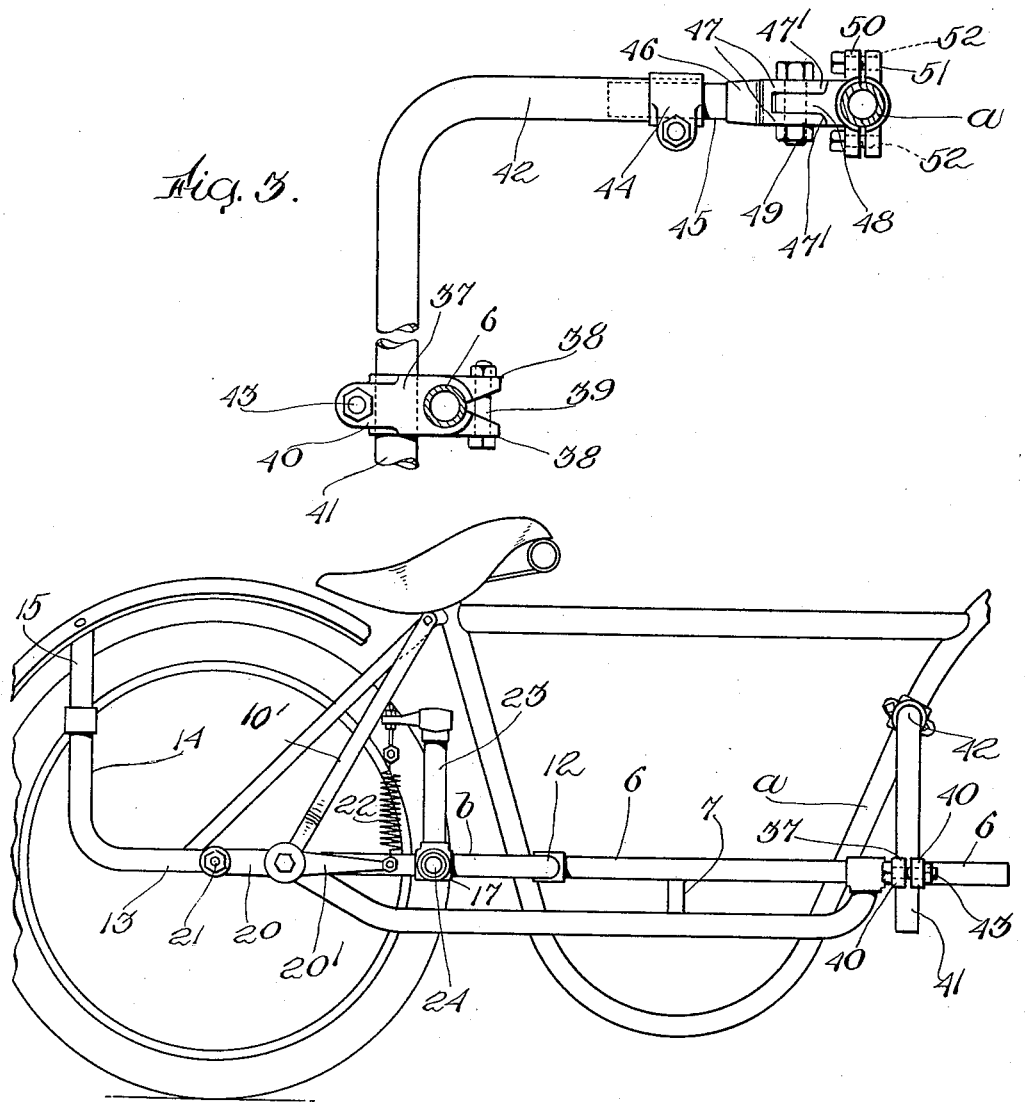

UNITED STATES PATENT OFFICE.

JAMES S. R. BAXTER, OF CAMBRIDGE, MASSACHUSETTS, ASSIGNOR TO BAXTER SIDE CAR COMPANY, A CORPORATION OF MASSACHUSETTS.

EXTENSION-FRAME FOR BICYCLES.

1,070,319.  Specification of Letters Patent.  Patented Aug. 12, 1913.

Application filed July 15, 1912. Serial No. 709,329.

*To all whom it may concern:*

Be it known that I, JAMES S. R. BAXTER, a subject of Great Britain, residing at Cambridge, in the county of Middlesex and State of Massachusetts, have invented a certain new and useful Extension-Frame for Bicycles, of which the following is a specification, reference being had to the accompanying drawings, forming part thereof.

This invention relates to improvements in extension frames for bicycles and similar vehicles and particularly to improvements in frames adapted to extend outward at the side of such vehicles to sustain loads.

One object of the invention is to so construct a side extension frame for bicycles as to facilitate the mounting of the side extension frame on a member or members of the bicycle frame and the adjustment of said extension frame relative to the bicycle frame.

Another object of the invention is to improve the construction of the side extension frame with reference to the mounting for an extension side wheel.

Another object of the invention is to improve the construction of the clips or clamps whereby the side extension frame is secured to the main or bicycle frame.

Other objects of the invention will appear from the following description.

The invention consists in the construction of the side extension frame.

The invention also consists in the novel clips or clamps and their related members.

The invention also consists in such other novel features of construction and combination of parts as shall hereinafter be more fully described and pointed out in the claims.

Figure 1:
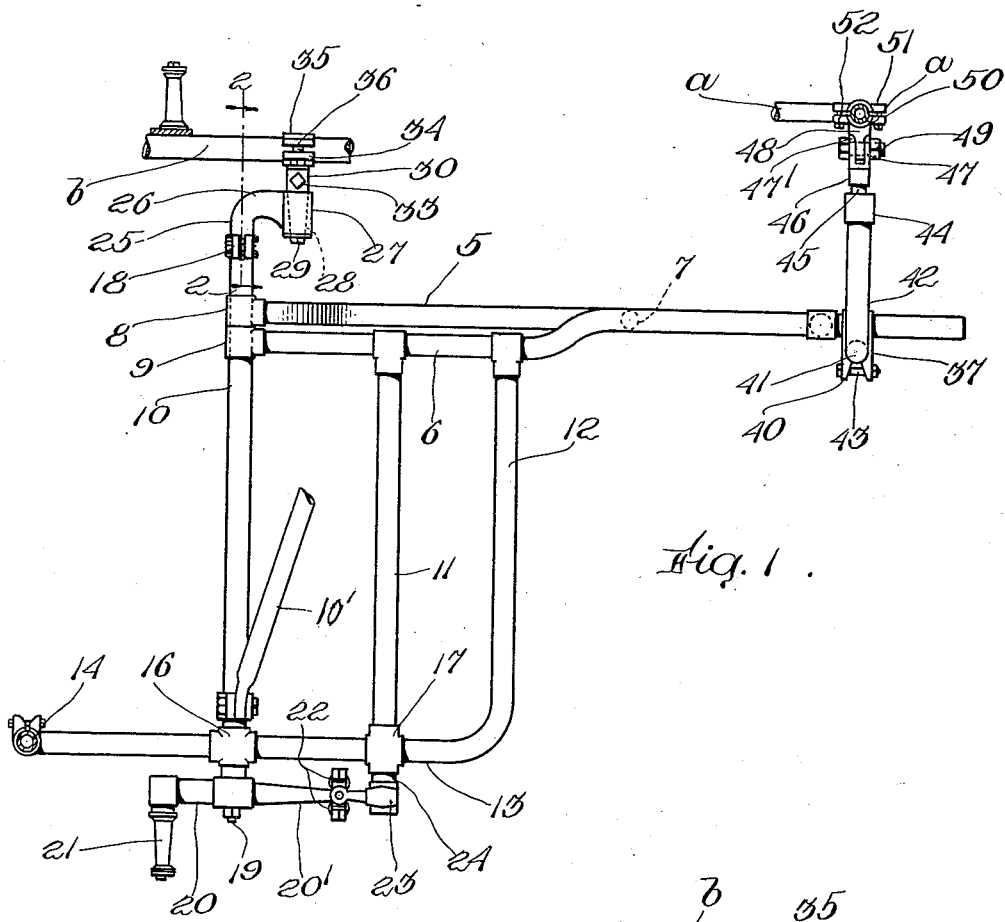
Figure 2:
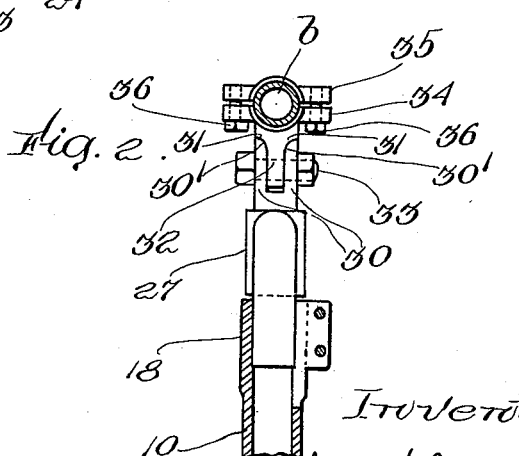

Figure 1 represents a plan view of the improved side extension frame shown in relation to members of the main vehicle frame, portions of the same being broken away and other portions being shown in section. Fig. 2 represents an enlarged detail view of the rear clip or clamp and the members more directly associated therewith. Fig. 3 represents an enlarged side view of the clips or clamps and their associated members used to connect the forward end of the side frame with the main frame. Fig. 4 represents a side elevation of parts of a bicycle frame having the improved side frame attached thereto, the side extension wheel being omitted.

Similar numerals and characters of reference designate corresponding parts throughout.

As shown in the drawings in its preferred form the improved side extension frame is illustrated in relation to a bicycle frame having the brace A and the rear fork member or side bar *b*, said main or bicycle frame however does not form a part of the present invention but is intended to represent any bicycle or vehicle frame to which the present invention, by reason of its attaching devices, may be secured.

In carrying this invention into practice I construct a frame, preferably from tubular members, having the side truss formed by the lower member 5, the upper member 6 and the strut 7. At the rear ends these truss members 5 and 6 have respectively the T, T's 8 and 9 which are mounted in alinement on the outwardly extending member 10 and from said T T's 8 and 9 said member 5 extends downward and forward a suitable distance and is then bent upward and secured to member 6, as shown in Fig. 4. This latter member 6 extends forward from its T 9 as shown in Fig. 1 and then curves above member 5 before the position of strut 7 is reached. Secured to member 6 are the outwardly extending members 11 and 12 of which member 12 is bent to form the outer side bar 13 and the upward extending standard 14 adapted to receive and carry the mud guard support 15 or any other article. Members 10 and 11 are respectively secured to the outer side bar 13 by means of the cross connections 16 and 17 and member 10 is furnished at its inner end with the clamping socket 18.

Extending outward from the cross connection 16 is the spindle 19 on which is pivotally mounted the lever 20 having at one end the wheel pintle 21 while the end of the other arm 20' of said lever is sustained by the coiled springs 22, 22 carried by a member of the post 23 which latter is mounted on the outwardly extending stud 24 of the cross connection 17. Thus the swinging movement of the end of lever 20 having pintle 21, in one direction is resisted by springs 22, 22.

Provision is made for securing the improved frame, above described, to the main frame of a bicycle or other vehicle and for adjusting said extension frame relative to such main frame. As shown herein clamp 18 is adapted to receive the end 25 of elbow 26 having the sleeve 27 furnished with a tapering bore and extending in a direction parallel to said end 25 and said sleeve 27 has closely fitting therein the tapering spindle 28 furnished with the nut 29 by means of which the sleeve 27 may be forced into frictional gripping contact with said spindle 28 or, when said nut 29 is loosened, the sleeve 27 and its elbow 26 may be swung around said spindle 28 to adjust frame member 10 relative to said spindle. Spindle 28 has the substantially parallel ears 30, 30 the ends of which are rounded as at 30', 30' Fig. 2 to meet complemental shoulders 31, 31 of the clamp tongue 32 to which tongue said ears 30, 30 are secured by the bolt 33 passing through perforations in said ears and said tongue whereby the spindle 28 is rigidly secured to said tongue but may readily be released therefrom by the withdrawal of said bolt. The tongue 32 is formed in part with the clamp member 34 and a similarly shaped clamp member 35 is provided which members 34 and 35 are secured together by the bolts 36, 36 to clamp therebetween the frame member b. By the use of the elbow 26 and its spindle 28 the extension frame may be adjusted as to height and such adjustment effects the relative location of the axis on which lever 20 swings.

Provision is made to adjustably secure the forward portion of the side extension frame to the member a of the main frame. Such provision comprises the clip or clamp 37 having jaws 38, 38 between which the extension frame member 6 may be gripped by the tightening of bolt 39 and the pair of jaws 40, 40 between which the vertical rod 41 of the extension elbow 42 may be secured by tightening the bolt 43. One end of the elbow 42 has the clamp 44 adapted to receive the shank 45 of the member 46 having the ears 47, 47 furnished with the rounded ends 47', 47' fitting against the complemental shoulders of the tongue 48 to which tongue said ears 47, 47 are secured by the bolt 49. This tongue 48 is formed in part with the clamp member 50 between which and the similar member 51 the main frame member a is secured by the tightening of the bolts 52, 52.

By the construction thus described the side extension frame comprising the member 6 and the extension of member 10 having clamp 18 can be secured to and adjusted with reference to the main frame members and when so adjusted said side extension frame can be readily detached from the main frame by the removal of the bolts 33 and 49 and as readily replaced in the adjusted position. The outer end portion of member 10 preferably is further secured to the main frame by the inclined brace 10' which at its upper end is fastened in any suitable manner to the upper portion of the main frame as is shown in Fig. 4.

In actual use a suitable wheel, not shown, is mounted on the spindle 21 of lever 20 and under shocks to said wheel said lever may swing on an axis offset from the axis of said wheel, that is the axis of spindle 21, but about an axis coincident with the axis of arm 25 of elbow 26.

Any baggage carrier or seat may be supplied to this improved extension frame but as such device does not of necessity form part of the present invention it is not herein shown.

Having thus described my invention I claim as new and desire to secure by Letters Patent.

1. A side extension frame comprising a truss having two main members, a cross member united to both of said truss members, adjustable securing means mounted at the inner end of said cross member, a lever pivotally mounted at the outer end of said cross member and having a wheel pintle, and means for resisting the swinging of said lever.

2. A side extension frame comprising a truss having two main members connected together at their forward ends and having their rear ends united in transverse alinement, a cross member forming the uniting means for said truss members, a lever mounted to swing about the axis of said cross member and having a wheel pintle, adjustable securing means mounted on the cross member for securing said member to a main frame, and adjustable securing means carried by one of said truss members and adapted to be secured to a main frame, substantially as described.

3. A side extension frame comprising a truss having a horizontal upper member offset laterally for a portion of its length from its lower member, an elbow member secured to the offset portion of said upper member, a pair of cross members secured to said upper member and to said elbow member a lever pivotally mounted on an extension of one of said cross members and having a wheel pintle, and yielding means connected with one end of said lever.

4. In an extension frame, the combination with a securing clamp having a tapering spindle, an elbow having at one end a sleeve having a tapering bore mounted on said spindle, of an extension frame having a clamp socket in which the end of said elbow is adjustably secured.

JAMES S. R. BAXTER.

Witnesses:
  E. C. MURPHY,
  HENRY J. MILLER.

Copies of this patent may be obtained for five cents each, by addressing the "Commissioner of Patents, Washington, D. C."